(12) United States Patent
Koo et al.

(10) Patent No.: US 8,320,456 B2
(45) Date of Patent: Nov. 27, 2012

(54) METHOD AND APPARATUS FOR PROCESSING A VIDEO SIGNAL

(75) Inventors: Han Suh Koo, Seoul (KR); Yeon Kwan Koo, legal representative, Seoul (KR); Byeong Moon Jeon, Seoul (KR); Seung Wook Park, Seoul (KR); Yong Joon Jeon, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 465 days.

(21) Appl. No.: 12/448,943

(22) PCT Filed: Jan. 17, 2008

(86) PCT No.: PCT/KR2008/000297
§ 371 (c)(1),
(2), (4) Date: Jan. 14, 2010

(87) PCT Pub. No.: WO2008/088175
PCT Pub. Date: Jul. 24, 2008

(65) Prior Publication Data
US 2010/0142617 A1 Jun. 10, 2010

Related U.S. Application Data

(60) Provisional application No. 60/885,290, filed on Jan. 17, 2007, provisional application No. 60/924,900, filed on Jun. 5, 2007, provisional application No. 60/969,700, filed on Sep. 4, 2007, provisional application No. 60/983,214, filed on Oct. 28, 2007.

(51) Int. Cl.
*H04N 7/12* (2006.01)
*H04N 11/02* (2006.01)
*H04N 11/04* (2006.01)

(52) U.S. Cl. .......... 375/240.16; 375/240.13; 375/240.26

(58) Field of Classification Search .............. 375/240.16
See application file for complete search history.

(56) References Cited

U.S. PATENT DOCUMENTS

| | | | |
|---|---|---|---|
| 2006/0083306 A1 | 4/2006 | Hsu | |
| 2006/0104364 A1 | 5/2006 | Kim | |
| 2006/0227878 A1 | 10/2006 | Mori et al. | |
| 2008/0095234 A1* | 4/2008 | Wang et al. | 375/240.13 |
| 2008/0117985 A1* | 5/2008 | Chen et al. | 375/240.26 |

OTHER PUBLICATIONS

Search Report for corresponding European Application No. 08704833.6 dated Jan. 28, 2011.

(Continued)

*Primary Examiner* — Behrooz Senfi
*Assistant Examiner* — Hee-Yong Kim
(74) *Attorney, Agent, or Firm* — Harness, Dickey & Pierce, P.L.C.

(57) ABSTRACT

An apparatus for processing a video signal and method thereof are disclosed. The present invention includes determining an intra reference block in a current view layer by using an intra motion information of an inter-reference unit in a reference view layer, the inter-reference unit being partially decoded and decoding the current block in the current view layer by using the intra-reference block. Accordingly, in coding a video signal, pictures failing to be substantially referred to for reconstruction of a current picture can be omitted. According to another aspect of the present invention, residual information having high redundancy is omitted to raise a compression ratio.

9 Claims, 12 Drawing Sheets

OTHER PUBLICATIONS

Pandit et al., "MVC single-loop decoding," 25. JVT Meeting; 82. MPEG Meeting; Oct. 21, 2007-Oct. 26, 2007; Shenzhen, CN; (Joint Video Team of ISO/IEC JTC1/SC29/WG11 and ITU-T SG. 16), No. JVT-Y042, Oct. 21, 2007, XP030007247.

Chen et al., "Single loop decode and motion skip in JMVM," 25. JVT Meeting; 82. MPEG Meeting; Oct. 21, 2007-Oct. 26, 2007; Shenzhen, CN; (Joint Video Team of ISO/IEC JTC1/SC29/WG11 and ITU-T SG. 16), No. JVT-Y053, Oct. 25, 2007, XP030007258.

Koo et al., "Cell: MVC motion skip mode," ITU Study Group 16—Video Coding Experts Group—ISO/IEC MPEG & ITU-T VCEG (ISO/IEC JTC1/SC29/WG11 and ITU-T SG16 Q6), No. JVT-V069, Jan. 10, 2007, XP030006877.

Guo et al, "Inter-View Direct Mode for Multiview Video Coding," IEEE Transactions on Circuits and Systems for Video Technology, IEEE Service Center, Piscataway, NJ, US, vol. 16, No. 12, Dec. 1, 2006, pp. 1527-1532, XP011151049.

Schwarz et al., "Constrained Inter-Layer Prediction for Single-Loop Decoding in Spatial Scalability," Image Processing, 2005. ICIP 2005, vol. 2, Sep. 11, 2005, pp. 870-873, XP010851192.

Guo et al., "Multiview Video Coding based on Global Motion Model," Advances in Multimedia Information Processing—PCM 2004: $5^{TH}$ Pacific Rim Conference on Multimedia, Tokyo, Japan, Nov. 30-Dec. 3, 2004, Springer, Berlin, vol. 3333, Nov. 30, 2004, pp. 665-672, XP002559461.

* cited by examiner

FIG. 7

| slice_header () {       | C | Descriptor |
|-------------------------|---|------------|
| first_mb_in_slice       | 2 | ue(v)      |
| slice_type              | 2 | ue(v)      |
| ic_enable               | 2 | u(1)       |
| motion_skip_enable_flag | 2 | u(1)       |
| ...                     |   |            |
| }                       |   |            |

FIG. 8

| slice_header () { | C | Descriptor |
|---|---|---|
| first_mb_in_slice | 2 | ue(v) |
| slice_type | 2 | ue(v) |
| ic_enable | 2 | u(1) |
| if (! anchor_pic_flag) | | |
| motion_skip_enable_flag | 2 | u(1) |
| ... | | |
| } | | |

| slice_header () { | C | Descriptor |
|---|---|---|
| first_mb_in_slice | 2 | ue(v) |
| slice_type | 2 | ue(v) |
| ic_enable | 2 | u(1) |
| if (! anchor_pic_flag && ! non_anchor_single_loop_decoding_flag) | | |
| motion_skip_enable_flag | 2 | u(1) |
| ... | | |
| } | | |

FIG. 11

| slice_header () { | C | Descriptor |
|---|---|---|
|   first_mb_in_slice | 2 | ue(v) |
|   ... | | |
|   if ( anchor_pic_flag && non_anchor_single_loop_decoding_flag) { | | |
|   i=InverseViewID(view_id) | | |
|     if(slice_type==P|| slice_type==B) { | | |
|       for(j=0; j<num_non_anchor_ref_l0[i]; j++) { | | |
|         for(compIdx=0; compIdx<2; compIdx++) | | |
|           global_disparity_mb_l0[j] [compIdx] | 2 | se(v) |
|       } | | |
|     } | | |
|   if(slice_type==B) { | | |
|       for(j=0; j<num_non_anchor_ref_l1[i]; j++) { | | |
|         for(compIdx=0; compIdx<2; compIdx++) | | |
|           global_disparity_mb_l1[j] [compIdx] | 2 | se(v) |
|   } | | |
|     } | | |
|   } | | |
|   pic_parameter_set_id | 2 | ue(v) |
|   ... | | |
| } | | |

FIG. 12

| slice_header () { | C | Descriptor |
|---|---|---|
|    first_mb_in_slice | 2 | ue(v) |
|    ... | | |
|    if (! anchor_pic_flag) { | | |
|    i=InverseViewID(view_id) | | |
|       if(slice_type==P || slice_type==B) { | | |
|          for(j=0; j<num_non_anchor_ref_l0[i]; j++) { | | |
|             for(compIdx=0; compIdx<2; compIdx++) | | |
|                global_disparity_mb_l0[j] [compIdx] | 2 | se(v) |
|          } | | |
|       } | | |
| if(slice_type==B) { | | |
|       for(j=0; j<num_non_anchor_ref_l1[i]; j++) { | | |
|          for(compIdx=0; compIdx<2; compIdx++) | | |
|             global_disparity_mb_l1[j] [compIdx] | 2 | se(v) |
| } | | |
|       } | | |
|    } | | |
|    pic_parameter_set_id | 2 | ue(v) |
|    ... | | |
| } | | |

FIG. 13

| slice_header () { | C | Descriptor |
|---|---|---|
| first_mb_in_slice | 2 | ue(v) |
| ... | | |
| if (! anchor_pic_flag && motion_skip_enable_flag) { | | |
| i=InverseViewID(view_id) | | |
| if(slice_type==P || slice_type==B) { | | |
| for(j=0; j<num_non_anchor_ref_l0[i]; j++) { | | |
| for(compIdx=0; compIdx<2; compIdx++) | | |
| global_disparity_mb_l0[j] [compIdx] | 2 | se(v) |
| } | | |
| } | | |
| if(slice_type==B) { | | |
| for(j=0; j<num_non_anchor_ref_l1[i]; j++) { | | |
| for(compIdx=0; compIdx<2; compIdx++) | | |
| global_disparity_mb_l1[j] [compIdx] | 2 | se(v) |
| } | | |
| } | | |
| } | | |
| pic_parameter_set_id | 2 | ue(v) |
| ... | | |
| } | | |

METHOD AND APPARATUS FOR PROCESSING A VIDEO SIGNAL

This application is a National Phase entry of PCT Application number PCT/KR2008/000297 filed on Jan. 17, 2008, which claims priority under 35 U.S.C. §§119(e), 120 and 365(c) to U.S. Provisional Application Nos. 60/885,290, 60/924,900, 60/969,700 and 60/983,214 filed on Jan. 17, 2007, Jun. 5, 2007, Sep. 4, 2007 and Oct. 28, 2007, respectively.

TECHNICAL FIELD

The present invention relates to video signal processing, and more particularly, to an apparatus for processing a video signal and method thereof. Although the present invention is suitable for a wide scope of applications, it is particularly suitable for decoding video signals.

BACKGROUND ART

Generally, compression coding means a series of signal processing techniques for transferring digitalized information via a communication circuit or storing digitalized information in a format suitable for a storage medium. Targets of compression coding include audio, video, character, etc. In particular, a technique of performing compression coding on video is called video compression. Video is generally characterized in having spatial redundancy and temporal redundancy.

DISCLOSURE OF THE INVENTION

Technical Problem

However, if the spatial redundancy and the temporal redundancy are not sufficiently eliminated, a compression rate in coding a video signal is lowered. Moreover, if the spatial redundancy and the temporal redundancy are excessively eliminated, it is unable to generate information required for decoding a video signal to degrade a reconstruction ratio.

Specifically, in a multi-view video coding (MVC), since inter-view pictures mostly have the difference caused by a camera position only, they tend to have very high relevance and redundancy. In case that the redundancy of the inter-view pictures is insufficiently eliminated, a compression ratio or a reconstruction rate is lowered.

Technical Solution

Accordingly, the present invention is directed to an apparatus for processing a video signal and method thereof that substantially obviate one or more of the problems due to limitations and disadvantages of the related art.

An object of the present invention is to provide an apparatus for processing a video signal and method thereof, by which the video signal from which redundancy of inter-view pictures is eliminated can be decoded in a manner of decoding motion information on motion information on an inter-view picture having relevance only by discriminating inter-view pictures having relevance.

Another object of the present invention is to provide an apparatus for processing a video signal and method thereof, by which the video signal is decoded using motion information on a picture having relevance based on relevance between inter-view pictures.

Advantageous Effects

According to one aspect of the present invention, it is able to omit decoding of non-related pictures in decoding a video signal, whereby reconstruction of the video signal can be promptly accomplished.

According to another aspect of the present invention, it is able to omit motion information having high redundancy in coding a video signal, thereby raising a compression ratio.

According to another aspect of the present invention, even if motion information on a current block is not transmitted, it is able to derive the motion information on the current block using motion information of a correspondent block existing in a different view, whereby a compression rate is enhanced.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7 to 9 are exemplary diagrams of syntax for a motion skip mode according to one embodiment of the present invention;

FIG. 10 is a block diagram of configurations of a motion information obtaining unit and an inter-motion information obtaining unit according to one embodiment of the present invention; and FIGS. 11 to 13 are exemplary diagrams on syntax for a motion skip mode according to one embodiment of the present invention.

BEST MODE

Figure 1:
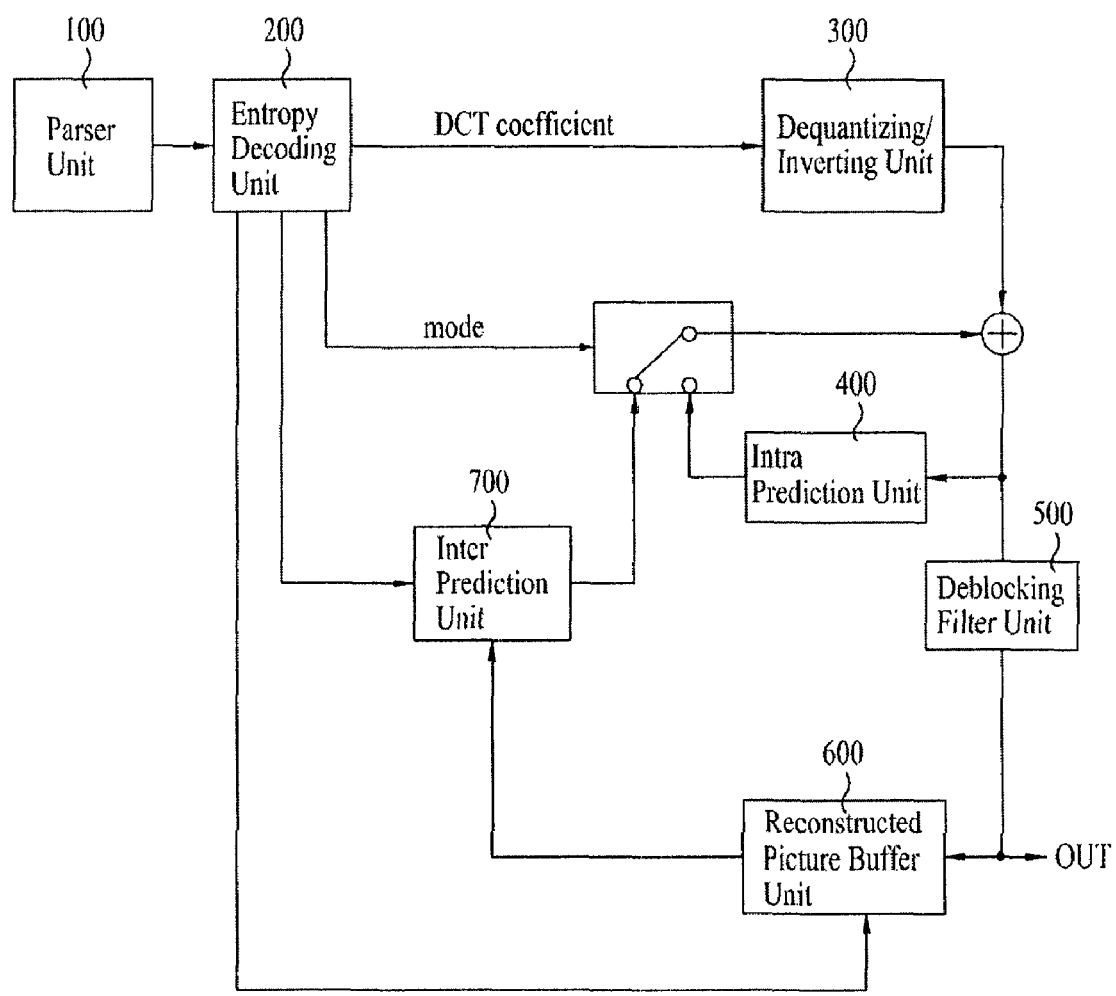
FIG. 1 is a schematic block diagram of an apparatus for decoding a video signal according to the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of decoding a current block according to the present invention includes determining an intra reference block in a current view layer by using a intra motion information of an inter-reference unit in a reference view layer, the inter-reference unit being partially decoded and decoding the current block in the current view layer by using the intra-reference block.

To further achieve these and other advantages and in accordance with the purpose of the present invention, a computer-readable-medium according to the present invention includes a program recorded therein to execute the method.

To further achieve these and other advantages and in accordance with the purpose of the present invention, an apparatus for decoding a current block according to the present invention includes an intra motion information extracting unit extracting intra motion information from an inter reference unit using inter motion information of a current unit, an intra reference block determining unit determining an intra reference block in a current view layer by using the intra motion information, and a current block decoding unit decoding a current block by using the intra reference block.

It is to be understood that both the foregoing general description and the following detailed description are exemplary and explanatory and are intended to provide further explanation of the invention as claimed.

Mode for Invention

Reference will now be made in detail to the preferred embodiments of the present invention, examples of which are illustrated in the accompanying drawings.

General terminologies used currently and globally are selected as terminologies used in the present invention. And, there are terminologies arbitrarily selected by the applicant for special cases, for which detailed meanings are explained in detail in the description of the preferred embodiments of the present invention. Hence, the present invention should be understood not with the names of the terminologies but with the meanings of the terminologies.

Compression coding of video signal data takes spatial redundancy, temporal redundancy, scalable redundancy, and inter-view redundancy into consideration. Compression coding scheme, which takes scalable redundancy into consideration, is just an embodiment of the present invention. And, the technical idea of the present invention is applicable to temporal redundancy, spatial redundancy, inter-view redundancy and the like.

First of all, unit used in this disclosure of the present invention can include every meaning of block, sub-block, macro-block, slice, picture, frame, picture group, sequence or the like in case of being applied to a video signal. For instance, the unit is usable as a lower unit indicating a block, a sub-block, a macro-block or the like or an upper unit indicating a slice, a picture, a frame, a picture group, a sequence or the like. So, the individual meaning of the unit should be construed as a corresponding meaning of each applied example. And, the unit can be construed as a different meaning suitable for a different signal to which the unit is applied as well as a video signal.

Specifically, motion information in the present invention should be construed as a concept that includes inter-view motion information as well as temporal motion information. Furthermore, a motion vector should be construed as a concept that includes inter-view disparity offset as well as temporal motion offset.

A first domain is not limited to designate a temporal direction. Pictures on the first domain are not limited to designate a group of pictures locating on the same view. A second domain is not limited to designate an inter-view direction (or spatial direction). Pictures on the second domain are not limited to designate a group of pictures having the same temporal instance. And, each of the first and second domains can be construed as designating either the temporal direction or the inter-view direction.

FIG. 1 is a schematic block diagram of an apparatus for decoding a video signal according to the present invention. Referring to FIG. 1, a video signal decoding apparatus includes a parsing unit 100, an entropy decoding unit 200, a dequantizing/inverting unit 300, an intra prediction unit 400, a deblocking filter unit 500, a reconstructed picture buffer unit 600 and an inter prediction unit 700.

The parsing unit 100 performs parsing by a unit of NAL (network abstraction layer) to decode a received video signal. Normally, before a slice header and slice data are decoded, at least one sequence parameter set (SPS) and picture parameter set (PPS) are transferred to a decoder. In this case, a NAL header unit, an extension unit of a NAL header or an extension unit of a sequence parameter set can contain various kinds of attribute information.

MVC (multi-view video coding) is a scheme additional to AVC scheme. And, various kinds of attribute informations relevant to the MVC can be added only case of an MVC bit stream. For instance, flag information for identifying whether it is an MVC bit stream in the NAL header unit or the extension unit of the NAL header can be added. Only if a bit stream inputted in accordance with the flag information is a multi-view video coding bit stream, it is able to add attribute informations regarding to a multi-view video coding signal on the bit stream. The attribute informations can include priority information, picture attribute information, single view information and the like. The attribute information included in the NAL unit is explained in detail with reference to FIG. 2 and FIG. 3 as follows.

Figure 2:
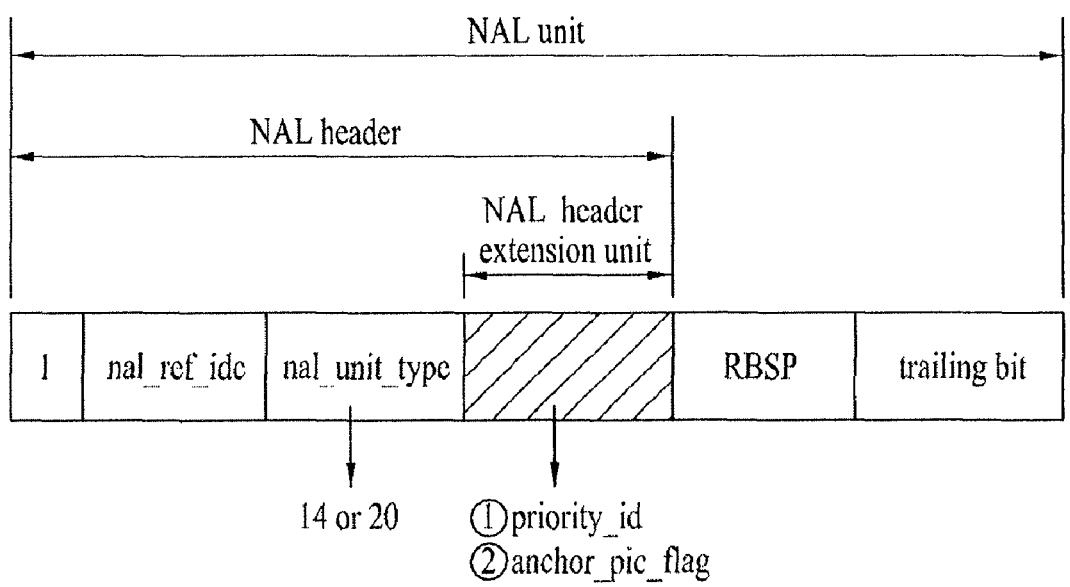
FIG. 2 is a diagram of attribute information on a multi-view video coding sequence added to a NAL header extension unit according to one embodiment of the present invention.

FIG. 2 shows a configuration of a NAL unit including priority information within an extension unit of a NAL header according to one embodiment of the present invention.

Referring to FIG. 2, a NAL unit basically includes a NAL header and an RBSP. The NAL header includes flag information nal_ref_idc indicating whether a slice becoming a reference picture of the NAL unit is included and identification information nal_unit_type indicating a type of the NAL unit. And, the NAL header can further include priority information priority_id that is the information indicating a priority of a sequence.

In the NAL unit, in case that the NAL header has an identification number 14 or 20, it is decided whether a corresponding picture is an SVC (scalable video coding) video signal or an MVC (multi-view video coding) video signal. In case that the corresponding picture is configured by MVC, the NAL unit includes the priority information priority_id. By the priority information, a decoding order of view pictures of a multi-view video coding sequence is decided. And, decoding is carried out on the view pictures with reference to inter-view pictures having priority information of a number smaller than that of their own. The priority information indicates that a smaller value corresponds to a priority in a multi-view video coding sequence.

Compressed data is stored in the RBSP. To represent a length of the RBSP as a multiple of 8 bits, an RBSP trailing bit is padded in a last portion of the RBSP.

In the present invention, a current view designates a view to be decoded and outputted in a multi-view video coding sequence. The current view includes a plurality of pictures on a time domain. And, there can exist at least one or more current views. Each of the pictures configuring the current view can have dependency on different inter-view or temporal pictures. For the current view, information should be fully decoded regardless of a presence or non-presence of the dependency on the different pictures.

In the present invention, partial decoding includes partial decoding of an upper unit and partial decoding of a lower unit.

And, details of the partial decoding will be explained with reference to a corresponding part in this disclosure later. Specifically, an example of the partial decoding of the upper unit may correspond to a single view decoding mode.

Figure 3:
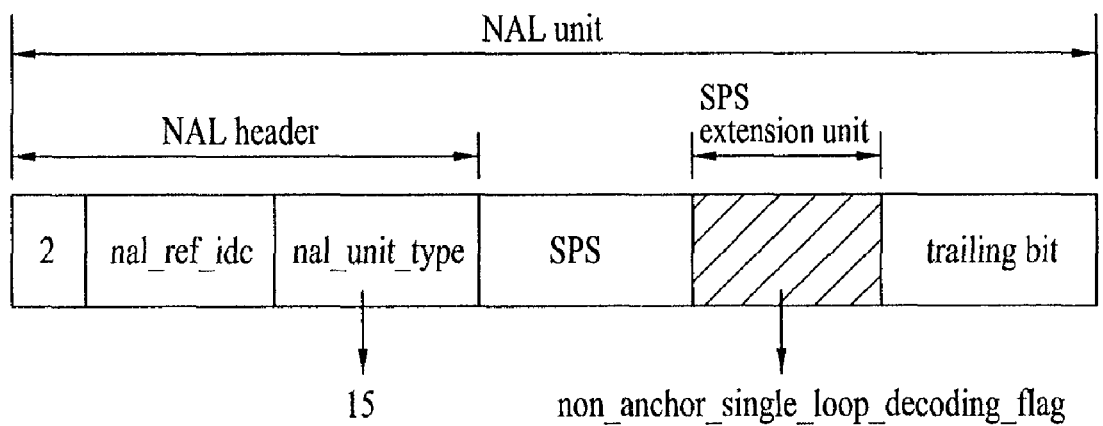
FIG. 3 is a diagram of attribute information on a multi-view video coding sequence added to an SPS extension unit according to one embodiment of the present invention.

FIG. 3 shows a configuration of a NAL unit including single view decoding information non_anchor_single_loop_decoding_flag within an SPS extension unit according to one embodiment of the present invention. In this case, a single view decoding mode means a scheme of decoding motion information or a block type only without decoding information such as residual and the like in a picture referred to by a current picture belonging to a current view. The single view decoding information indicates whether a corresponding sequence carries out a single view decoding mode. If the single view decoding information is set to 0, information on all pictures of a reference view including a reference picture referred to for decoding of a current picture belonging to a current view is fully decoded. Otherwise, if the single view decoding information is set to 1, pictures of a view not referred to by a current picture are not decoded but motion information (reference index, motion vector, etc.) and a macro-block type on a reference picture included in a view refereed to by a current picture are partially decoded only.

For instance, if a NAL header of a NAL unit has an identification number 15, the NAL unit pages a sub MVC extension profile with a profile identifier (ID) designating MVC. The sub MVC extension file includes the single view decoding information non_anchor_single_loop_decoding_flag within an SPS extension unit.

Referring to FIG. 1, a parsed bit stream is entropy-decoded by the entropy decoding unit 20, and a coefficient, motion vector and the like of each macro-block is extracted. The dequantizing/inverting unit 30 obtains a coefficient value transformed by multiplying a received quantized value by a predetermined constant and then reconstructs a pixel value by inverting the coefficient value. The intra prediction unit 40 performs intra-view prediction from a decoded sample within a current picture using the reconstructed pixel value. The deblocking filter unit 50 uses a filter to decrease block distortion in each coded macro-block. In this case, the filter smoothens edges of a block to enhance an image quality of a decoded frame. And, a selection of this filtering process depends on a boundary strength and a gradient of an image sample around a boundary. A picture outputted from the deblocking filter unit 50 is inputted and stored in the decoded (reconstructed) picture buffer unit 60 to be used as an output and/or reference picture.

The decoded picture buffer unit 60 stores a previously coded picture to perform intra-view prediction in the intra prediction unit 40 or outputs a previously stored picture. In multi-view video coding, the stored or outputted pictures include pictures of a view different from that of a current picture. So, in order to fully use these pictures as reference pictures, frame_num, POC (picture order count) and the like of each picture are used. And, view information for identifying a view of each picture are usable as well as the frame_num, the POC and the like.

In performing inter-view prediction, a single view decoding mode according to the present invention designates a scheme for reconstructing a current picture in a manner of decoding motion information and a block type of a reference picture referred to by the current picture only and then using the corresponding information instead of decoding all pictures included in a view different from a current view for the decoding of the current picture included in the current view. Inter-view pictures, which are generated from taking a same object by varying a position of a camera, has considerable similarity in-between, and motion information on a current picture has considerable similarity to motion information of a different view referred to by the current picture.

In particular, since a current picture refers to most similar pictures of a different view for inter-view prediction, information substantially required for decoding of the current picture mostly exists in a reference picture. However, in the reconstruction of multi-view video coding signal, a multi-view decoding mode for decoding all pictures regardless of being reference pictures of a current picture is generally adopted. Since other information on the reference picture is necessary as well as motion information, in case that a number of sequences is raised or that a user attempts to watch a specific view only, it is inefficient. Hence, in case of a multi-view video coding signal, it may be advantageous to use a single view decoding mode according to the present invention.

The inter prediction unit 70 performs inter-view prediction using the previously stored picture outputted from the decoded picture buffer unit 60 as a reference picture. In a multi-view decoding mode, the inter prediction unit 70 decodes a motion of a current block using informations transferred from the entropy decoding unit 20. The inter prediction unit 70 extracts motion vectors of blocks neighbor to a current block from a video signal and then obtains a motion vector prediction value of the current block. And, the motion of the current block is compensated using the obtained motion vector prediction value and a differential vector extracted from the video signal.

Yet, in a single view decoding mode of the present invention, motion information on a current block is extracted using motion information on a reference block existing in a different view in case of performing inter-view prediction. The extracted motion information can be executed using at least one reference block. In multi-view video coding, in case that a current picture refers to pictures in a different view, motion information is obtained using view dependency obtained at a sequence level and a current block can be then decoded using the motion information. A process for obtaining the motion information will be explained in detail with reference to FIG. 10 later.

The inter-predicted picture and the intra-predicted pictures, through the above process, are selected in accordance with a prediction mode to reconstruct a current picture. In particular, when decoding is carried out in a single view decoding mode, in case that a current picture is used as a reference picture for inter-view prediction of a picture belonging to a current view, partial information such as a block type and motion information is decoded. In decoding a picture belonging to a current view, motion information and block type of a current block are obtained using motion information and block type of a reference picture and the current block is decoded using the obtained motion information.

A single view decoding mode according to the present invention is explained in detail with reference to the accompanying drawings as follows.

Figure 4:
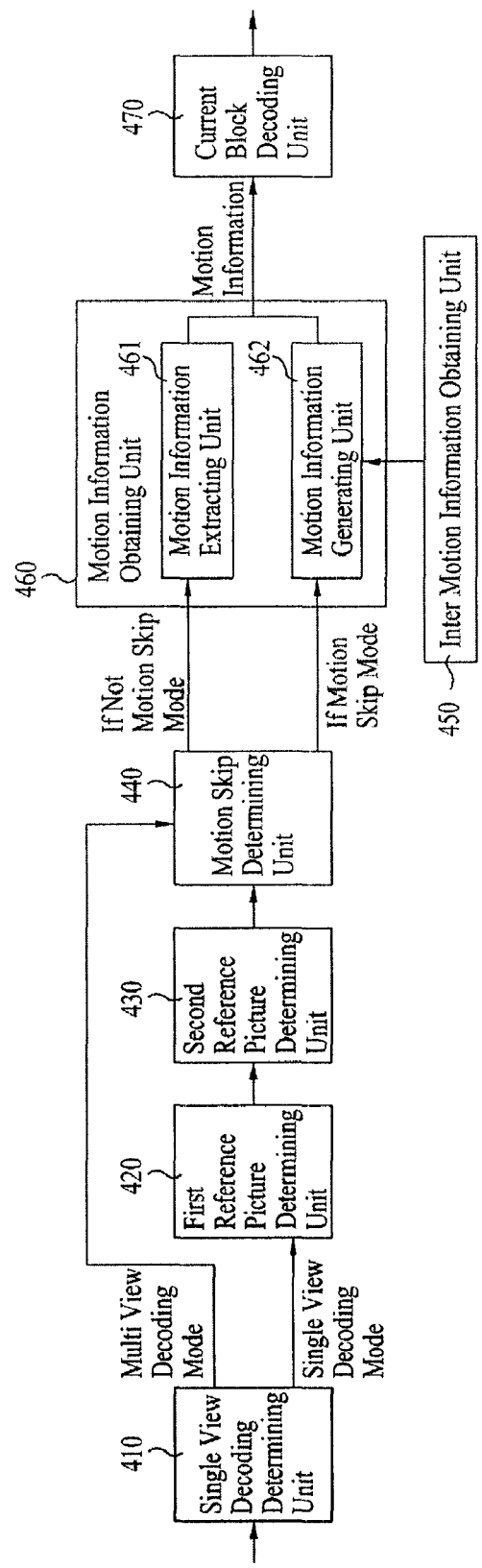
FIG. 4 is a block diagram of an apparatus for decoding a video signal by a single view mode according to one embodiment of the present invention.
Figure 5:
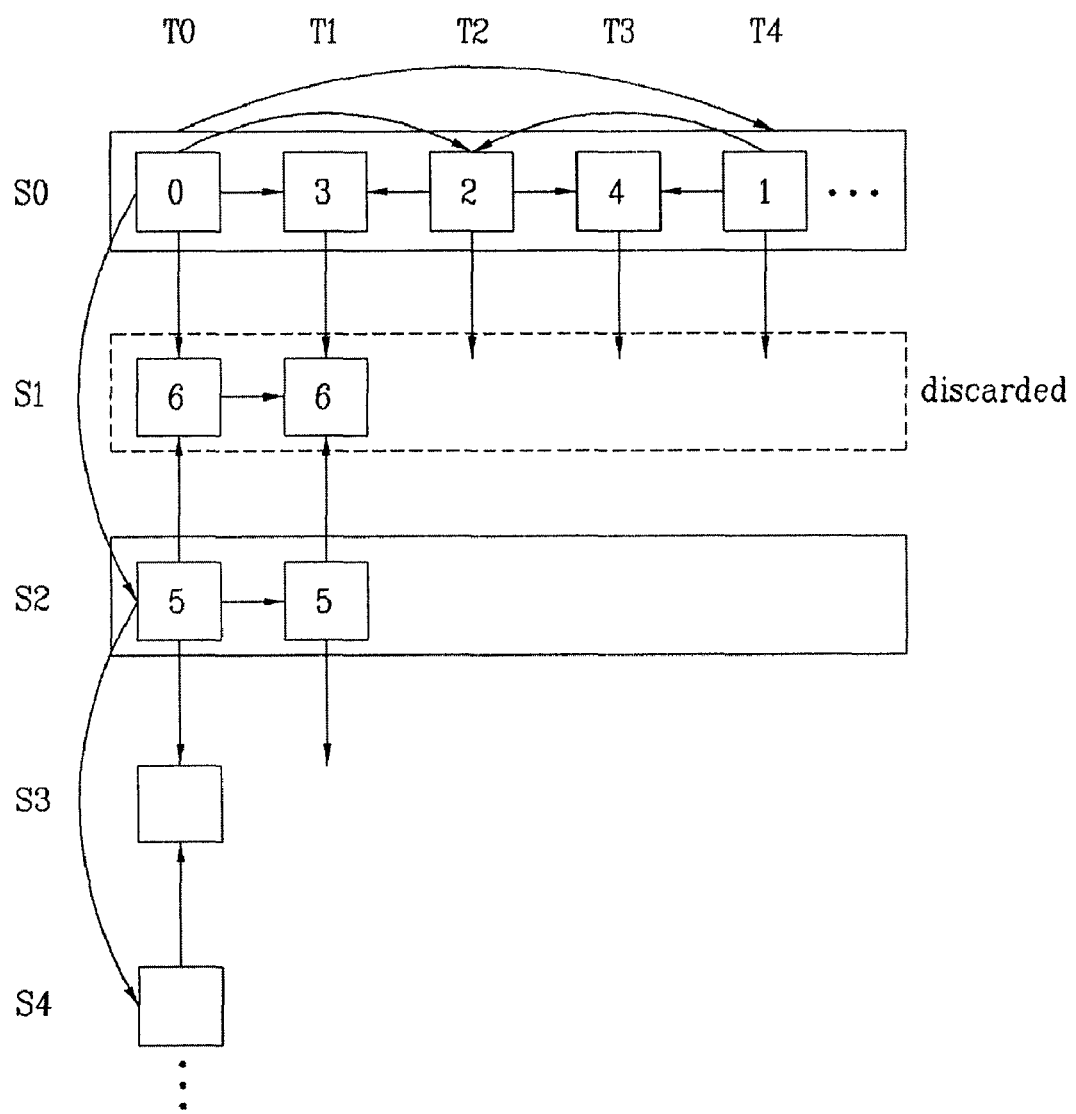
FIG. 5 and FIG. 6 are diagrams for a video signal decoding method by a single view mode according to one embodiment of the present invention.
Figure 6:
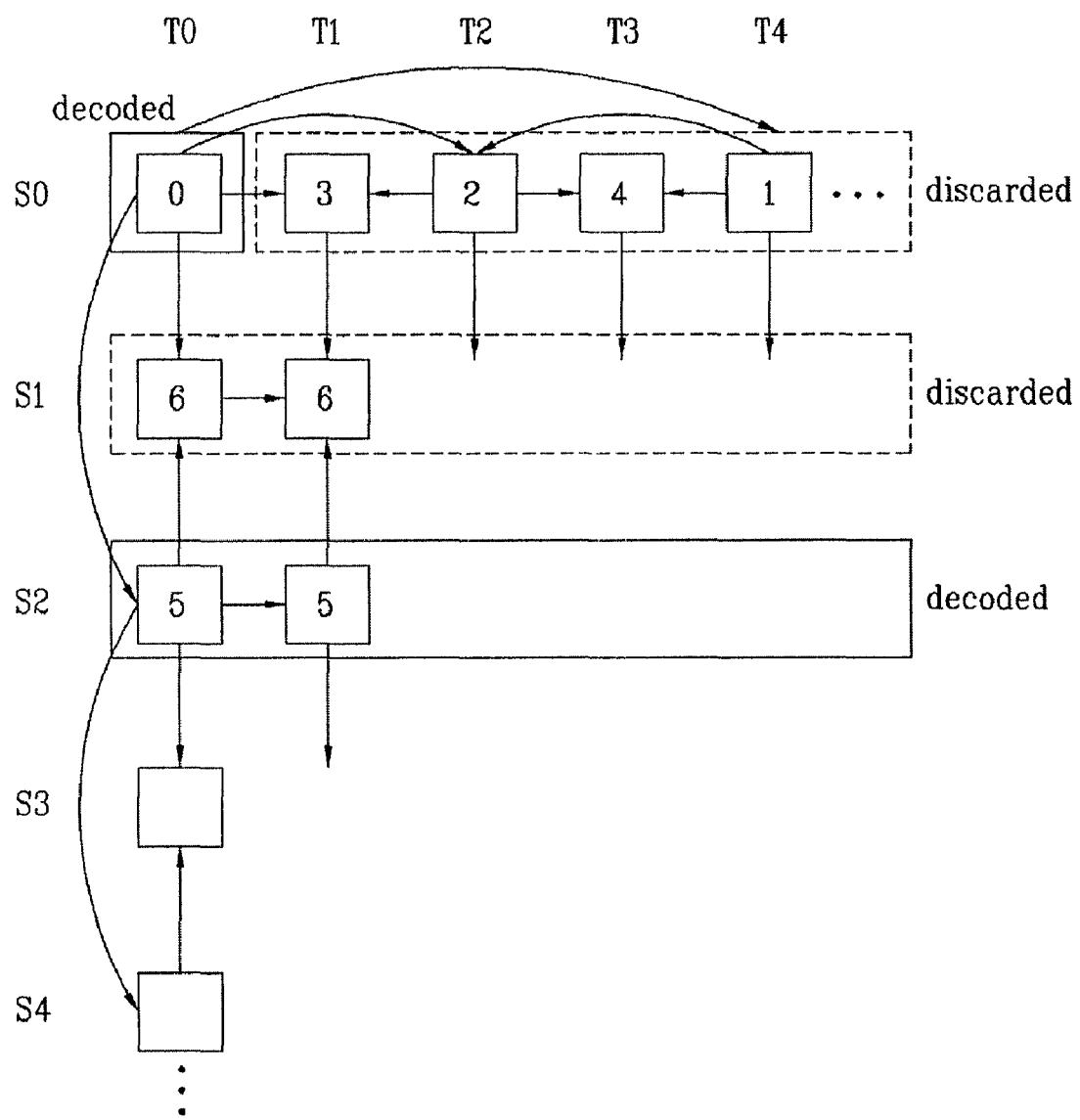

FIG. 4 is a schematic block diagram of an inter prediction unit 70 of an apparatus for decoding a video signal by a single view decoding mode according to one embodiment of the present invention, and FIG. 5 and FIG. 6 are diagrams for a video signal decoding method by a single view decoding mode according to one embodiment of the present invention.

Referring to FIG. 4, a video signal processing apparatus for performing inter-view prediction of a multi-view video coding sequence according to the present invention includes a single view decoding determining unit 410, a first reference picture determining unit 420, a second reference picture determining unit 430, a motion skip determining unit 440, an inter motion information obtaining unit 450, a motion information obtaining unit 460, and a current block decoding unit 470. The motion skip determining unit 440, the inter motion information obtaining unit 450 and the motion information obtaining unit 460 will be explained in detail for the description of a part relevant to a motion skip mode later.

The single view decoding determining unit 410 extracts single view decoding information non_anchor_single_loop_decoding_flag and the like and then determines whether a current sequence is in a single view decoding mode or not. As mentioned in the foregoing description of FIG. 3, single view decoding information is extracted from an SPS extension unit of NAL unit. The single view decoding information is the information indicating whether a single view decoding mode, in which a current block belonging to a current view is decoded using motion information on a reference block for inter-view prediction, is used or not. If single view decoding information non_anchor_single_loop_decoding_flag is '0', it means that all information on the reference block is decoded by a multi view decoding mode for reconstruction of a current block.

The single view decoding mode decodes portions of multi view pictures for reconstruction of a current picture belonging to a current view. Yet, in case of anchor picture, since there exists inter-view prediction only, if a current picture is an anchor picture, motion information for temporal prediction does not exist. So, if a current picture is an anchor picture, information on the current picture should be fully decoded. Hence, prior to the determining step of the single view decoding determining unit 410, it is able to further include a step of extracting anchor picture flag information anchor_pic_flag on a header extension unit of a NAL unit (not shown in the drawing). In this case, the anchor picture flag information anchor_pic_flag is the information that indicates whether a current picture is an anchor picture. If the current picture is the anchor picture, the single view decoding mode is not used. So, it is unnecessary to extract the single view decoding information.

If single view decoding information is '0', it is unnecessary to partially decode a picture referred to by a current picture only. And, a step of determining a reference picture to decode is not necessary. Hence, the reference picture is directly inputted to the motion skip determining unit 440 without passing through the first reference picture determining unit 420 and the second reference picture determining unit 430. Otherwise, if single view decoding information is '1', it is necessary to determine reference pictures to be decoded for reconstruction of a current picture by the first reference picture determining unit 420 and the second reference picture determining unit 430. A process for the determination is explained in detail with reference to FIG. 5 and FIG. 6 as follows.

Referring to FIG. 5, a video signal inputted to the first reference picture determining unit 420 discards a bit stream associated with a picture included in an unnecessary view in a manner of deciding a view including pictures to be decoded for reconstruction of a current picture by referring to the priority information shown in FIG. 2. In FIG. 5, an x-axis indicates a time domain, a y-axis indicates a view domain, and a numeral within a picture indicates priority information. As mentioned in the foregoing description, if the priority information has a smaller numeral, it has a higher priority. Referring to FIG. 5, in case that a current picture exists in a view S2, priority information is 5. And, pictures in a view S1, each of which has priority information 6 greater than the numeral, become unnecessary for decoding of a current picture. So, pictures in a view having priority information of a numeral greater than that of priority information on a current view are not fully decoded by the first reference picture determining unit 420.

Referring to FIG. 6, the second reference picture determining unit 430 decides view dependency of a non-anchor picture in a current view. The view dependency of the non-anchor picture indicates whether a current picture is referred to for inter-view prediction of a picture belonging to a different view. The view dependency can be decided in accordance with a sequence parameter set (SPS) extension information. And, a process for deciding view dependency using a sequence parameter set extension information can be executed prior to a decoding execution by a block unit.

An arrow shown in FIG. 6 indicates a view dependency relation. The second reference picture determining unit 430 discards pictures having no view dependency from the pictures remaining after the primary discardment by the first reference picture determining unit 420. In FIG. 6, for pictures at a level S2 of a current view, since a picture at a level S0 at time T0 has a view dependency relation, decoding is carried out on the picture at the level S0 at time T0. Since a picture at the level S0 at time T1 has no view dependency relation, decoding is not carried out on the picture at the level S0 at time T1.

Meanwhile, view dependency of a non-anchor picture can be decided in accordance with inter-view reference picture number information num_non_anchor_refs_1X and view determination information non_anchor_ref_1X of the reference picture. In case of a picture having no view dependency on a current picture that is a non-anchor picture, motion information on the picture without the view dependency is not necessary for decoding of the current picture. So, decoding is not carried out thereon. Hence, the second reference picture determining unit 430 determines reference pictures having view dependency on a current picture and is then able to reconstruct the current picture using information on the reference pictures determined in a motion skip mode which will be explained later.

Motion skip mode according to the present invention means a scheme for generating motion information on a current block by itself using motion information on a block existing in a different view in case that motion information (e.g., block type, motion vector, reference picture determining information, prediction direction identifying information, etc.) required for inter-picture prediction is not transmitted. In particular, since inter-view units in a multi-view video coding signal are obtained by changing positions of a camera only and have considerable similarity in-between, motion information has considerable similarity between a current unit and a different unit, e.g., a reference block existing in a different view.

Referring to FIG. 4 and FIG. 7, the motion skip determining unit 440 of the present invention determines whether to generate motion information on a current unit using motion information on a unit in a different view. In this case, it is able to use a motion skip flag motion_skip_enable_flag. If the motion skip flag is '0', motion information on a current block is obtained from a received bit stream without executing a motion skip mode. If the motion skip flag is '1', motion information on a current block is derived from motion information on a block existing in a different view by executing a motion skip mode.

Figures 9, 10:
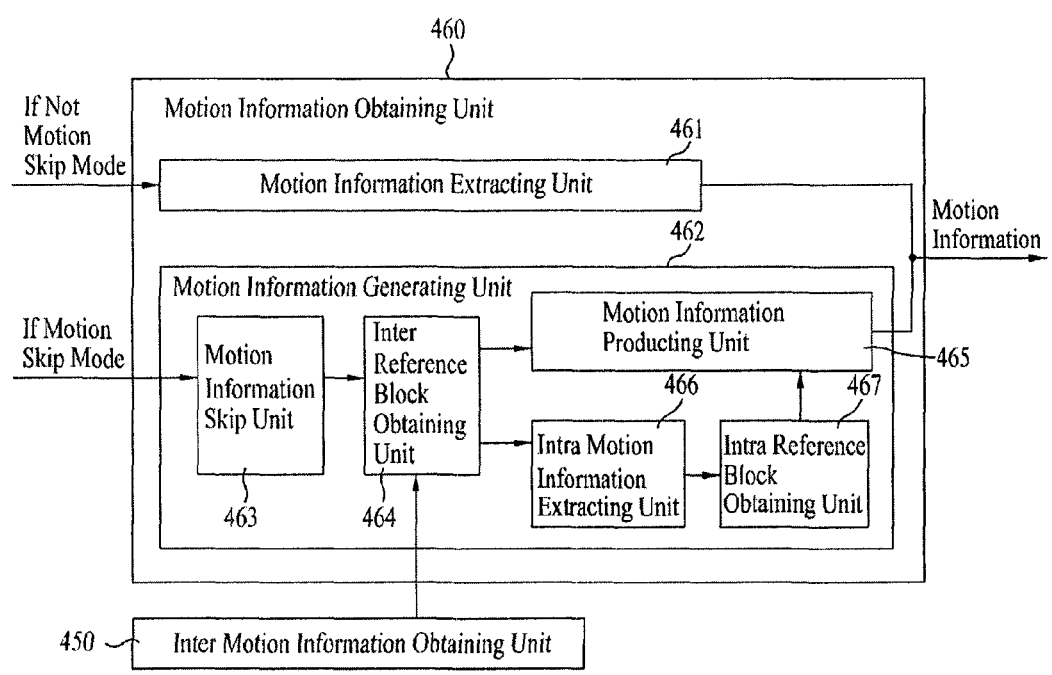

FIG. 8 and FIG. 9 are exemplary diagrams of syntax for a motion skip mode according to another embodiment of the present invention.

Referring to FIG. 8, since an anchor picture executes decoding by inter-view prediction only, a motion skip mode is not used. So, in case that a picture to which a current slice belongs is an anchor picture, it is unnecessary to extract motion skip flag information. Hence, without out extracting motion skip information for all slices, it is able to obtain motion skip flag information only if it is a non-anchor picture condition [if(!anchor_pic_flag)].

Referring to FIG. 9, a motion skip mode is applied to a non-anchor picture and a single view decoding mode is applied to a non-anchor picture as well. If single view decoding information non_anchor_single_loop_decoding_flag is '1', in case of using a single view decoding mode, it is able to analogize that a motion skip mode is applicable to a corresponding non-anchor picture. Hence, complexity of coding can be reduced by obtaining motion skip flag information only if non-anchor picture and single view decoding mode condition [if(!anchor_pic_flag && !non_anchor_single_loop_decoding_flag)].

FIG. 10 shows configurations of a motion information obtaining unit and an inter-motion information obtaining unit according to one embodiment of the present invention.

Referring to FIG. 10, a motion information obtaining unit 460 includes a motion information extracting unit 461, a motion information skip unit 462, an inter reference block searching unit 464, a motion information producing 465, an intra motion information extracting unit 466, and an intra reference block obtaining unit 467. If a current block is not in a motion skip mode, motion information extracting unit 461 extracts motion information transferred to the current block. Yet, if a current unit is in a motion skip mode, the motion information skip unit 463 skips a step of extracting motion information from a bitstream in a current unit. The inter reference block searching unit 464 then searches for a reference block within an inter reference unit.

The inter reference block searching unit 464 firstly decides a reference view layer in which a reference block exists to search for an inter reference block. The reference view layer is a view different from a view to which a current block belongs and is a view of picture having motion information suitable to be used as motion information on the current block. A view identifier (view_id) of a neighboring view of a current block can be explicitly transferred via a specific parameter included in a slice layer or a macro-block layer. Alternatively, an identifier of a neighboring view of a current block can be estimated based on view dependency of the current block in the single view determination explained in the foregoing description without being explicitly transferred. Unit of every picture unit including the reference view is not decoded but can be partially decoded in accordance with a presence or non-presence of view dependency on a picture including a current block.

In the present invention, partially decoding indicates that lower units included in a designated view or picture are not fully decoded in being used in a view or picture unit or indicates that motion information and a block type are decoded only in being used in a block unit without decoding residual information and the like.

To decide the reference view, blocks of pictures having view dependency on a current picture are sequentially searched for a picture of which block is not constructed with an intra mode. The pictures having the view dependency can exist in one of at least two or more reference picture lists. For instance, reference pictures belonging to a first list are searched for a corresponding block of a picture nearest to a current picture. In case that the corresponding block is constructed with an intra mode, reference pictures belonging to a second list are searched for a corresponding block of a picture nearest to the current picture. In case that the corresponding block is constructed with the intra mode, the reference pictures are searched again for a corresponding block of a picture second nearest to the current picture next to the nearest picture. In case that the corresponding block is constructed with an inter mode, the picture having the corresponding block is decided as a reference picture. For the decision of the reference picture, the search keeps being carried out in a manner of alternating the first and second reference picture lists until the corresponding block is not constructed with the intra mode. An order of picture for performing the search for the corresponding block in each of the lists can be executed in accordance with a view identifier view_id, to which implementations of the present invention are not limited.

Subsequently, the inter reference block searching unit 464 can use information indicating an inter-view disparity offset to search for a reference block. For instance, a motion vector generated between views may be dependent on depth of each object. If spatially considerable variation does not exist in depth of sequence and if motion of sequence itself in accordance with variation of a time axis is not considerable, the depth at each macro-block position may not vary considerable. In this case, the depth means information capable of indicating an inter-view disparity offset.

In the method according to the present invention, a correspondent block of the reference view is decided using inter motion information. The inter motion information provided for inter-view prediction is used to reduce inter-view redundancy. And, the inter motion information can include a global motion vector (global disparity vector), a local motion vector (local disparity vector) and the like. Basically, since influence of inter motion vector such as a global motion vector and the like may exist between cameras in multi-view video coding sequence (MVC), in case that inter motion information is considerably larger than depth variation, it is efficient to use the inter motion information.

The inter motion information is the motion information corresponding to an overall area including its partial area. In this case, the overall area may correspond to a single slice, a single picture or a full sequence. Occasionally, the overall area may correspond to at least one object area and a background area.

Meanwhile, global motion information as an example of inter motion information on a higher unit can be a value of a slice unit, a picture or frame unit or a filed unit, whereas inter motion information on a lower unit can have a value of 4×4 block unit, 8×8 block unit, macro-block unit, pixel unit or ¼ pixel unit.

It is able to transfer inter motion information in various ways. For instance, it is able to transfer inter motion information for every slice within a non-anchor picture, each non-anchor picture, each slice belonging to an anchor picture or each anchor picture. It is able to transfer inter motion information for each slice of an anchor picture only if there exists view dependency of a non-anchor picture.

FIGS. 11 to 13 are exemplary diagrams on syntax for a motion skip mode according to one embodiment of the present invention.

Referring to FIG. 11, global motion vector information is necessary to produce motion information in case of a motion skip mode and is used for a non-anchor picture. Since both inter-view prediction using pixel information in a non-anchor picture and motion skip mode are applied to multi view decoding mode, a block of the non-anchor picture may have an local motion vector corresponding to a lower unit. Since the local motion vector is usable to derive intra motion information for intra prediction, it is not necessary to transfer a global motion vector for a motion skip in that case.

On the contrary, since a non-anchor picture of a singe view decoding mode carries out a motion skip only, motion information should be obtained from an inter reference block of a reference view to decode a current block belonging to a current view. So, for a motion skip of a non-anchor picture, i.e., to obtain an inter reference block of a reference view, the non-anchor picture needs information on a global motion vector. Meanwhile, it is not always necessary to extract the global motion vector information. In particular, only if a decoding mode is a single view decoding mode and only if a current picture is an anchor picture [if(anchor_pic_flag && non_anchor_single_loop_decoding_flag)], it needs to obtain the global motion vector information.

Referring to FIG. 12, a global motion vector is the information necessary for a motion skip of a non-anchor picture and needs not to be transferred in an anchor picture only. So, it is able to transfer a global motion vector for each non-anchor picture under condition of a non-anchor picture [if (!anchor_pic_flag)]. Referring to FIG. 13, since a global motion vector is used to carry out a motion skip in a non-anchor picture regardless of a single view decoding mode or a multi view decoding mode, it is able to transfer a global motion vector only if a current picture is a non-anchor picture in a motion skip mode [if(!anchor_pic_flag && motion_skip_enable_flag)].

Referring now to FIG. 10, the inter motion information obtaining unit 450 obtains a global motion vector under the condition proposed in FIG. 10, FIG. 11 or FIG. 12 and then inputs the obtained global motion vector to the inter reference block searching unit 464. The inter reference block searching unit 464 is able to obtain the global motion vector. This may be calculated based on a global motion vector of anchor pictures or by a preset value or a preset scheme in case that a global motion vector of an anchor picture is not transferred (e.g., if there does not exist view dependency of an anchor picture), which does not restrict various embodiments of the present invention.

The inter reference block searching unit 464 decides an inter reference block using the decided reference view and the inter motion information. In particular, a reference block (mbAddrNeighbor) corresponds to a location of a point shifted from a same location (mbAddr) of a current block by a global motion vector (globalDisparityMbLX), and an address of the reference block can be calculated by Formula 1.

$$mbAddr\text{Neighbor}=mbAddr+\text{globalDisparity}MbLX[1]*\\Pic\text{Width}InMbs+\text{globalDisparity}MbLX[0]$$ [Formula I]

Referring to Formula I, an address (mbAddrNeighbor) of a reference block is a value resulting from adding an address value of inter motion information (globalDisparityMbLX) to an address (mbAddr) of a current block. In this case, the address value (globalDisparityMbLX[1]*PicWidthInMbs+ globalDisparityMbLX[0]) of the inter motion information is a value resulting from transforming a 2-dimensional vector into a 1-dimensional index in a manner of, if inter motion information is a global motion vector, multiplying a y-axis component (globalDisparityMbLX[1]) of the global motion vector by a block number (PicWidthInMbs) in a horizontal direction within a picture and then adding an x-axis component (globalDisparityMbLX[0]) of the global motion vector to the result of the multiplication. In this case, the reference block is preferably decided as existing within a picture having a same time of the current block among pictures in a neighbor view. The reference block is not fully decoded but motion information and block type are decoded in part. The motion information can include at least one of a motion vector and a reference index.

In a decoding method according to the present invention, the reference block includes intra motion information for intra prediction, e.g., temporal prediction. The intra motion information is the information for prediction of a picture in a different time zone in the same view and may include a motion vector, block type information, reference index information or the like. By intra motion information on a correspondent block, a current block of the present invention is able to decide an intra reference block existing in a different picture on a same view of the current block. Information necessary for decoding of the current block is obtained from the intra reference block and is then used.

The motion information producing unit 465 extracts motion information and block type of a reference block. The motion information or block type of the reference block may be the information extracted from a current block by the motion information extracting unit 461. For instance, in case that a current block belonging to a current view in a multi view decoding mode has motion information for inter-view prediction, it is able to obtain a reference block including a reference block and a location of the reference block using the inter-view motion information.

The motion information producing unit 465 obtains motion information and block type of the current block using the former motion information and block type extracted by the above method. The motion information on the reference block is directly usable as the motion information on the current block, which does not restrict various implementations of the present invention.

A motion skip mode in a multi loop decoding mode obtains a pixel value by adding a pixel value in a reference picture and a residual value transferred from a bitstream to each other using motion information on a current block obtained by the motion information producing unit 465 [sample prediction]. Yet, in a single view decoding mode according to a video signal processing method of the present invention, as mentioned in the foregoing description, motion information such as a motion vector, a block type, a reference index and the like is decoded from a picture used as a reference picture having view dependency on a current picture existing in a current view but a step of obtaining a pixel value, which is executed in multi-loop scheme, is not executed. Hence, the single view decoding mode is able to reduce complexity unlike a motion skip of a multi view decoding mode.

A motion skip of a single view decoding mode per forms decoding by parsing a reference picture of a current picture belonging to a current view into block type and motion information only but does not perform decoding on the reference picture from the motion information. So, it is unable to obtain information from the reference picture except motion information such as residual information and the like. The information, which is necessary for reconstruction of the current picture except the motion information but is not obtainable from the reference picture, is obtained with reference to previously decoded pictures on a different time of a same view of the current picture.

A video signal processing method of the present invention can be executed by a profile. In this case, the profile (compression coding function) means specification of technical elements provided for a process sequence to execute an algorithm encoding step in a video encoding/decoding process. Namely, the profile can be called a set of technical elements necessary to decode a bit sequence of a compressed sequence.

The profile is defined as collecting technical elements and function at least mandatory for a representative application system. And, in a video signal processing method of the present invention, the following profiles can be defined.

First of all, a single view decoding profile allows partial decoding of a reference view. In case of a reference block, the single view decoding profile allows decoding of motion information and block type only.

Regarding a reference view relevant to a current view, the single view decoding profile adopts a scheme of decoding a reference view having dependency partially using view dependency information. A view level concept is applicable to the selection of the reference view. For instance, if a current view is S2, a view level higher than S2 may not be decoded in part. Hence, motion skip information motion_skip_flag is coded at both a view B and a view P.

Secondly, a multi view decoding profile adopts a scheme of fully decoding all views existing in an access unit. Hence, since all views are used for a motion skip mode regardless of view dependency information, motion skip information is coded at both a view B and a view P.

As mentioned in the foregoing description, a decoding/encoding apparatus, to which the present invention is applied, is provided to a multimedia broadcast transmitting/receiving device such as a DMB (digital multimedia broadcasting) transmitting/receiving device and the like and is then usable in decoding video signal, data signal and the like. And, the multimedia broadcast transmitting/receiving device can include a mobile communication terminal.

Moreover, the encoding/decoding method of the present invention can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bit stream produced by the encoding method is stored in a computer-readable recording medium or can be transmitted via wire/wireless communication network.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to multi-view video encoding and decoding.

What is claimed is:

1. A method of decoding a multi-view video signal, comprising:
    obtaining anchor picture flag information of a current picture in a current view from the multi-view video signal, the anchor picture flag information indicating whether the current picture is an anchor picture or a non-anchor picture;
    obtaining motion skip information of a current block in the current picture when the anchor picture flag information indicates the current picture is the non-anchor picture;
    generating motion information of the current block by using motion information of a corresponding block in a neighboring view when the current block is in a motion skip mode according to the motion skip information;
    determining a reference block in the current view based on the motion information of the current block; and
    decoding the current block in the current view by using the reference block,
    wherein the generating including:
    determining the corresponding block in the neighboring view based on view dependency and a global motion vector of the current picture, the view dependency being determined based on reference number information and view identification information for a plurality of views, the global motion vector of the current picture being derived from a global motion vector of the anchor picture; and
    obtaining the motion information from the determined corresponding block.

2. The method of claim 1, wherein the reference block exists on other pictures in the current view except the current picture having the current block located thereon.

3. The method of claim 1, wherein the motion information comprises motion vector, block type information, and reference index.

4. The method of claim 1, wherein the corresponding block in the neighboring view is at a same temporal location as the current block in the current view.

5. The method of claim 1, wherein the reference number information indicates a number of reference views and view identification information is a view identifier of each view.

6. The method of claim 1, wherein the multi-view video signal is received as a broadcast signal.

7. The method of claim 1, wherein the multi-view video signal is received on a digital medium.

8. A non-transitory computer-readable-medium comprising a program recorded therein to execute the method of claim 1.

9. An apparatus for decoding a multi-view video signal, comprising:
    a decoding apparatus configured to,
        obtain anchor picture flag information of a current picture in a current view from the multi-view video signal, the anchor picture flag information indicating whether the current picture is an anchor picture or a non-anchor picture,
        obtain motion skip information of a current block in the current picture when the anchor picture flag information indicates the current picture is the non-anchor picture,
        determine a corresponding block in a neighboring view based on view dependency and a global motion vector of the current picture when the current block is in a motion skip mode according to the motion skip information,
        obtain motion information from the determined corresponding block,
        generate motion information of the current block by using the motion information of the corresponding block in the neighboring view,
        determine a reference block in the current view based on the motion information of the current block, and
        decode the current block in the current view by using the reference block,
    wherein the view dependency is determined based on reference number information and view identification information for a plurality of views, and
    wherein the global motion vector of the current picture is derived from a global motion vector of the anchor picture.

* * * * *